(12) United States Patent
Cheon

(10) Patent No.: US 10,919,525 B2
(45) Date of Patent: Feb. 16, 2021

(54) ADVANCED DRIVER ASSISTANCE SYSTEM, VEHICLE HAVING THE SAME, AND METHOD OF CONTROLLING THE VEHICLE

(71) Applicant: MANDO CORPORATION, Pyeongtaek-si (KR)

(72) Inventor: Seunghun Cheon, Seongnam-si (KR)

(73) Assignee: MANDO CORPORATION, Suwon-si (KR)

( * ) Notice: Subject to any disclaimer, the term of this patent is extended or adjusted under 35 U.S.C. 154(b) by 0 days.

(21) Appl. No.: 16/738,437

(22) Filed: Jan. 9, 2020

(65) Prior Publication Data
US 2020/0391731 A1 Dec. 17, 2020

(30) Foreign Application Priority Data
Jun. 11, 2019 (KR) .................. 10-2019-0068780

(51) Int. Cl.
*B60W 30/09* (2012.01)
*B60W 10/20* (2006.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/20; B60W 10/18; B60W 30/18163; B60W 2554/80; B60W 2420/42; G06K 9/00805; G06K 9/00798
See application file for complete search history.

(56) References Cited

U.S. PATENT DOCUMENTS 6,138,062 A * 10/2000 Usami .................. B62D 15/026
180/168
2004/0178945 A1* 9/2004 Buchanan ............. G01S 13/931
342/70
(Continued)

FOREIGN PATENT DOCUMENTS

| JP | 2011-128786 A | 6/2011 |
| KR | 10-2018-0010487 A | 1/2018 |
| KR | 10-2018-0070402 A | 6/2018 |

*Primary Examiner* — Mary Cheung
(74) *Attorney, Agent, or Firm* — Morgan, Lewis & Bockius LLP

(57) ABSTRACT

Provided is a vehicle capable of: acquiring an image of a road in front of a vehicle in an autonomous driving mode; recognizing a lane line, a subject lane, and an obstacle on the acquired image of the road; determining whether the recognized obstacle is in a stationary state based on obstacle information detected by an obstacle detector; acquiring, if the obstacle in the stationary state exists on at least one of two subject lane lines constituting the subject lane, a width of the obstacle overlapping the subject lane; determining whether keeping of travelling on the subject lane is to be performed based on the acquired width of the obstacle overlapping the subject lane; performing a deflection control within the subject lane to avoid the obstacle in the stationary state if it is determined that the keeping of travelling on the subject lane is to be performed; and performing control of departure from the subject lane or deceleration control if it is determined that the keeping of travelling on the subject lane is not to be performed.

20 Claims, 10 Drawing Sheets

(51) Int. Cl.
*B60W 10/18* (2012.01)
*G06K 9/00* (2006.01)
*B60W 30/18* (2012.01)

(52) U.S. Cl.
CPC ... *B60W 30/18163* (2013.01); *G06K 9/00798* (2013.01); *G06K 9/00805* (2013.01); *B60W 2420/42* (2013.01); *B60W 2554/80* (2020.02)

(56) References Cited

U.S. PATENT DOCUMENTS

| | | | |
|---|---|---|---|
| 2012/0081542 A1* | 4/2012 | Suk | H04N 7/181 |
| | | | 348/139 |
| 2015/0294547 A1* | 10/2015 | Ito | G08B 21/06 |
| | | | 340/576 |
| 2017/0066444 A1* | 3/2017 | Habu | G08G 1/166 |
| 2018/0004223 A1 | 1/2018 | Baldwin | |
| 2019/0077459 A1* | 3/2019 | Miura | B62D 15/0255 |
| 2019/0084579 A1* | 3/2019 | Maura | B60W 30/10 |

\* cited by examiner

ADVANCED DRIVER ASSISTANCE SYSTEM, VEHICLE HAVING THE SAME, AND METHOD OF CONTROLLING THE VEHICLE

CROSS-REFERENCE TO RELATED APPLICATION

This application is based on and claims priority under 35 U.S.C. § 119 to Korean Patent Application No. 2019-0068780, filed on Jun. 11, 2019 in the Korean Intellectual Property Office, the disclosure of which is incorporated herein by reference.

BACKGROUND

1. Field

The present disclosure relates to an advanced driver assistance system, capable of recognizing a lane line, and performing autonomous driving based on the position of the recognized lane line, a vehicle having the same, and a method of controlling the same.

2. Description of the Related Art

A vehicle is a machine that travels by driving wheels and transports people or cargo while moving on a road. Such a vehicle may have an accident due to failure of the vehicle, driver's carelessness, an error of another vehicle, or road condition.

Recently, there have been development on various types of advanced driver assistance systems (ADAS) that are designed to inform a driver of travelling information of a vehicle to prevent an accident from occurring due to driver's carelessness and perform autonomous driving for driver's convenience.

One example of the ADAS is a technology for detecting an obstacle around a vehicle by installing a distance sensor on the vehicle and warning the driver of the obstacle. With this technology, accidents are prevented in advance.

Another example of the ADAS is a technology in which the distance to another vehicle is obtained through an electromagnet mounted on a bumper of a vehicle, and if the distance to the other vehicle is within a certain distance, the situation is determined to be a collision situation and power is supplied to the electromagnet to generate a magnetic force that allows the vehicle to be automatically braked in the collision situation.

Another example of the ADAS is an autonomous driving control technology in which the vehicle recognizes a road environment by itself, determines a travelling situation, and automatically controls the travelling of the vehicle according to a planned travel route such that the vehicle automatically travels to a destination Such an autonomous driving control device for autonomous driving control technology generates a route for avoidance travel in real time by recognizing a variation of the obstacle and the lane line. In this case, in order to perform more stable autonomous driving on the actual road, it is important to determine a collision with static or dynamic objects around the vehicle and perform avoidance travel according to a result of the determination.

In other words, when the autonomous driving control device has a difficulty in performing the avoidance travel during autonomous driving control, the vehicle may not perform stable travelling, and the risk of collision with an obstacle may be increased.

SUMMARY

Therefore, it is an object of the present disclosure to provide an advanced driver assistance system capable of adjusting a moving route based on the width of a subject lane and the position of another vehicle, a vehicle having the same, and a method of controlling the same.

It is another object of the present disclosure to provide an advanced driver assistance system capable of performing at least one of a moving route adjustment or a braking control based on the width of a subject lane and a possibility of a collision with another vehicle, a vehicle having the same, and a method of controlling the same.

Additional aspects of the disclosure will be set forth in part in the description which follows and, in part, will be obvious from the description, or may be learned by practice of the disclosure.

In accordance with one aspect of the present disclosure, an advanced driver assistance system includes: a camera configured to acquire an image of a road in front of a vehicle; and a controller including a processor configured to process the image of the road acquired by the camera, wherein the controller recognizes a lane line, a subject lane, and an obstacle based on the acquired image of the road, and if an obstacle in a stationary state exists on at least one of two subject lane lines constituting the subject lane, outputs a braking control signal or a moving route adjusting signal.

The controller may determine a width of the obstacle overlapping the subject lane in the stationary state based on the acquired image of the road, and keep travelling on the subject lane if the acquired width of the obstacle overlapping the subject lane is less than or equal to a reference width, and control departure from the subject lane if the acquired width of the obstacle overlapping the subject lane is greater than the reference width.

In the keeping of the travelling on the subject lane, the controller may allow the vehicle to travel on the subject lane by identifying a direction of the obstacle in the stationary and performing a deflection control in a direction opposite to the identified direction with respect to the subject lane.

In the controlling of the departure from the subject lane, the controller may identify position information of another obstacle, determine a possibility of collision with the other obstacle based on the identified position information of the other obstacle, and if it is determined that there is no possibility of collision with the other obstacle, control the vehicle to travel by crossing the subject lane line.

In the controlling of the departure from the subject lane, the controller may identify position information of another obstacle, determine a possibility of collision with the other obstacle based on the identified position information of the other obstacle, and if it is determined that there is a possibility of collision with the other obstacle, control the vehicle to change lanes.

The controller may identify a state of the obstacle that crosses the subject lane line, and if the state of the obstacle is changed from a stationary state to a travel state, identify a variation of the width of the obstacle overlapping the subject lane, and if the identified width of the involvement increases, control lane change.

The controller may acquire a width of the obstacle overlapping the subject lane in the stationary state based on the acquired image of the road, determine whether the keeping of travelling on the subject lane is to be performed based on the acquired width of the obstacle overlapping the subject lane, perform control of departure from the lane if the keeping of travelling on the subject lane is not to be performed, and in the controlling of the departure from the lane, determine a possibility of collision with another obstacle based on position information of the other obstacle, and control deceleration if it is determined that there is a possibility of collision with the other obstacle.

The advanced driver assistance system may further include an obstacle detector configured to detect an obstacle, wherein the controller may acquire position information of an obstacle based on obstacle information detected by the obstacle detector, and determine whether the obstacle is in a stationary state based on the acquired position information of the obstacle.

In accordance with another aspect of the present disclosure, a vehicle includes: an image sensor configured to acquire an image of a road in front of a vehicle; a non-image sensor including a LiDAR sensor and a radar sensor; a controller including a process configured to process the image of the road acquired by the image sensor and data sensed by the non-image sensor; a steering system configured to perform steering in response to a command of the controller; and a braking system configured to perform braking in response to a command of the controller, wherein the controller recognizes a lane line, a subject lane, and an obstacle on the acquired image of the road, determines whether the recognized obstacle is in in a stationary state based on the sensed data, and if the obstacle in the stationary state exists on at least one of two subject lane lines constituting the subject lane selectively outputs a braking control signal or a moving route adjusting signal to the steering system or the braking system.

The controller may acquire a width of the obstacle overlapping the subject lane in the stationary state based on the acquired image of the road, determines whether keeping of travelling on the subject lane is to be performed based on the acquired width of the obstacle overlapping the subject lane, and if the keeping of travelling on the subject lane is to be performed, perform a deflection control within the subject lane to avoid the obstacle in the stationary state.

In the performing of the deflection control within the subject lane, the controller may identify a direction of the obstacle in the stationary and perform a deflection control in a direction opposite to the identified direction with respect to the subject lane.

The controller may control departure from the subject lane to avoid the obstacle in the stationary state if it is determined that the keeping of travelling on the subject lane is not to be performed.

In the controlling of the departure from the subject lane, the controller may determine a possibility of collision with another obstacle, and if it is determined that there is no possibility of collision with the other obstacle, control the vehicle to travel by crossing the subject lane line.

In the controlling of the departure from the subject lane, the controller may determine a possibility of collision with another obstacle, and if it is determined that there is no possibility of collision with the other obstacle, control the vehicle to change lanes.

The controller may identify a variation of the width of the obstacle overlapping the subject lane if a state of the obstacle crossing the subject lane line is changed from a stationary state to a travel state, and control lane change if the identified width of the obstacle overlapping the subject lane increases.

In accordance with another aspect of the present disclosure, a method of controlling a vehicle includes: acquiring an image of a road in front of a vehicle in an autonomous driving mode; recognizing a lane line, a subject lane, and an obstacle on the acquired image of the road; determining whether the recognized obstacle is in a stationary state based on obstacle information detected by an obstacle detector; acquiring, if the obstacle in the stationary state exists on at least one of two subject lane lines constituting the subject lane, a width of the obstacle overlapping the subject lane; determining whether keeping of travelling on the subject lane is to be performed based on the acquired width of the obstacle overlapping the subject lane; performing a deflection control within the subject lane to avoid the obstacle in the stationary state if it is determined that the keeping of travelling on the subject lane is to be performed; and performing control of departure from the subject lane or deceleration control if it is determined that the keeping of travelling on the subject lane is not to be performed.

The performing of the deflection control within the subject lane may include identifying a direction of the obstacle in the stationary and performing a deflection control in a direction opposite to the identified direction with respect to the subject lane.

The controlling of the departure from the subject lane may include: determining a possibility of collision with another obstacle; and controlling the vehicle to travel by crossing the subject lane line if it is determined that there is no possibility of collision with the other obstacle.

The controlling of the departure from the subject lane may include: determining a possibility of collision with another obstacle in the controlling of the departure from the subject lane; and controlling the vehicle to change lanes if it is determined that there is no possibility of collision with the other obstacle.

The method may further include, if a state of the obstacle crossing the subject lane line is changed from a stationary state to a travel state, identifying a variation of the width of the obstacle overlapping the subject lane, and if the identified width of the obstacle overlapping the subject lane increases, controlling lane change.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
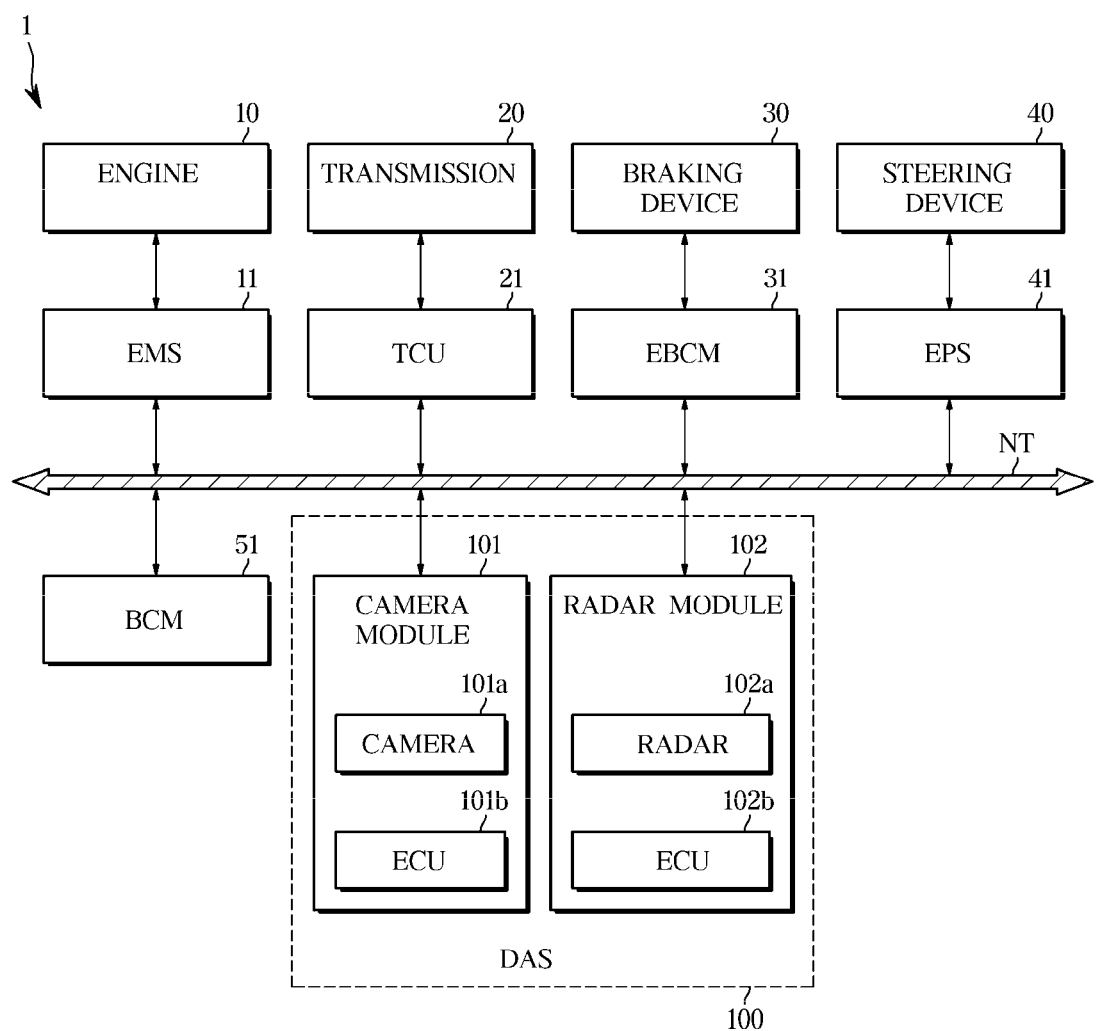
FIG. 1 is a block diagram illustrating a vehicle according to an embodiment.

Like numerals refer to like elements throughout the specification. Not all elements of embodiments of the present disclosure will be described, and description of what are commonly known in the art or what overlap each other in the embodiments will be omitted.

The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it should be understood that, when a member is referred to as being "on/under" another member, it can be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 is a block diagram illustrating a vehicle according to an embodiment.

The vehicle according to the embodiment may refer to a vehicle that performs a manual travelling mode for driving in response to a driver's driving intent and an autonomous driving mode for autonomously travelling to a destination.

Referring to FIG. 1, the vehicle 1 includes an engine 10, a transmission 20, a braking device 30, and a steering device 40.

The engine 10 may include a cylinder and a piston, and generate power for the vehicle 1 to travel.

The transmission 20 may include a plurality of gears, and transmit power generated by the engine 10 to wheels.

The braking device 30 may decelerate the vehicle 1 or stop the vehicle 1 through friction with the wheels.

The steering device 40 may change the travelling direction of the vehicle 1.

The vehicle 1 may include a plurality of electrical components.

For example, the vehicle 1 further includes an engine management system (EMS) 11, a transmission control unit (TCU) 21, and an electronic brake control module (EBCM) 31), an electronic power steering (EPS) 41, a body control module (BCM), and an advanced driver assistance system (ADAS).

The EMS 11 may control the engine 10 in response to acceleration intent of a driver through an accelerator pedal or a request of an advanced driver assistance system (ADAS) 100. For example, the EMS 11 may control the torque of the engine 10.

The TCU 21 may control the transmission 20 in response to a shift command of the driver through a shift lever and/or a travelling velocity of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS).

The EBCM 31 may selectively release braking of the vehicle wheel in response to over-steering and/or under-steering sensed at a time of steering of the vehicle 1 (electronic stability control, ESC).

In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The ADAS 100 may assist the driver in manipulating (driving, braking, steering) the vehicle 1. For example, the ADAS 100 may detect a surrounding environment (e.g., another vehicle, a pedestrian, a cyclist, a lane, a road sign, etc.) around the vehicle 1 and control the driving and/or braking and/or steering of the vehicle 1 in response to the sensed surrounding environment.

The ADAS 100 may provide the driver with various functions. For example, the DAS 60 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The ADAS 100 may include a collision avoidance device for outputting notification information about collision with an obstacle or for avoiding the obstacle, to prevent collision with the obstacle.

The ADAS 100 may include an autonomous driving control apparatus (200 in FIG. 4) that allows a vehicle to recognize a road environment by itself, determine an obstacle and a travelling situation, and control the travelling of the vehicle according to a planned travelling route while avoiding an obstacle such that the vehicle automatically travels to a destination.

The ADAS 100 may include a camera module 101 for acquiring image data around the vehicle 1 and a radar module 102 for acquiring obstacle data around the vehicle 1.

The camera module 101 may include a camera 101a and an electronic control unit (ECU) 101b, and may photograph the front of the vehicle 1 and recognize other vehicles, pedestrians, cyclists, lanes, road signs, and the like.

The radar module 102 may include a radar 102a and an electronic control unit (ECU) 102b and may acquire relative positions and relative velocities of obstacles (e.g., other vehicles, pedestrians, cyclists, and the like) around the vehicle 1.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like.

The ADAS 100 may transmit a driving control signal, a braking signal, and a steering signal to the EMS 11, the EBCM 31, and the EPS 41, respectively, through the NT.

Figure 2:
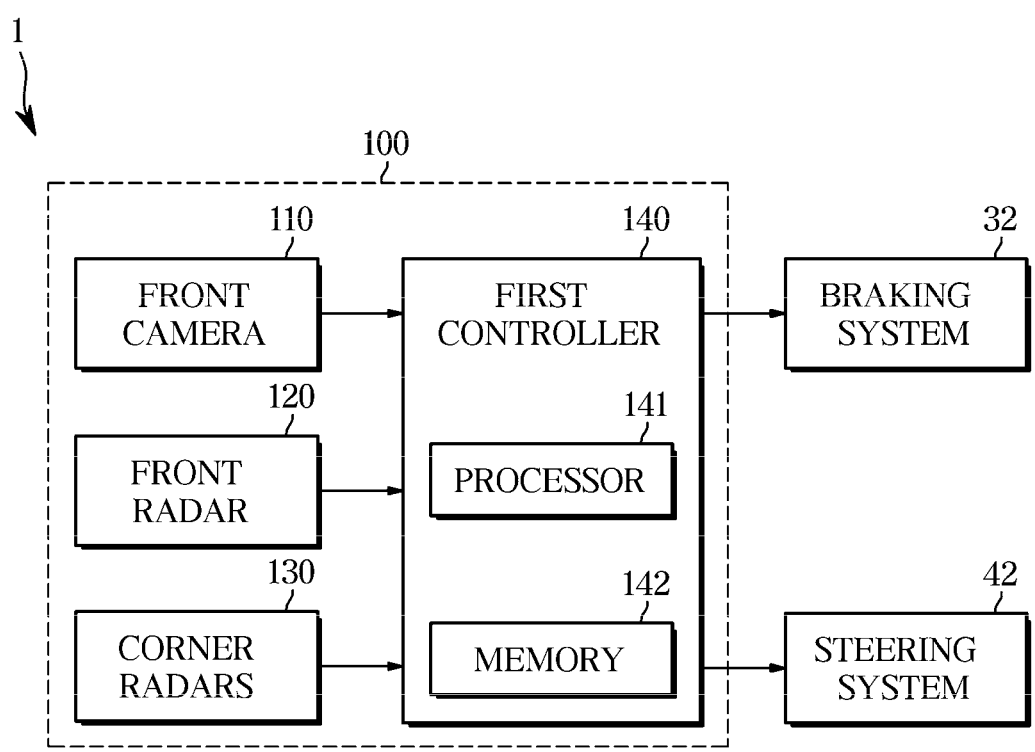
FIG. 2 is a block diagram illustrating an advanced driver assistance system (ADAS) provided in a vehicle according to an embodiment.
Figure 3:
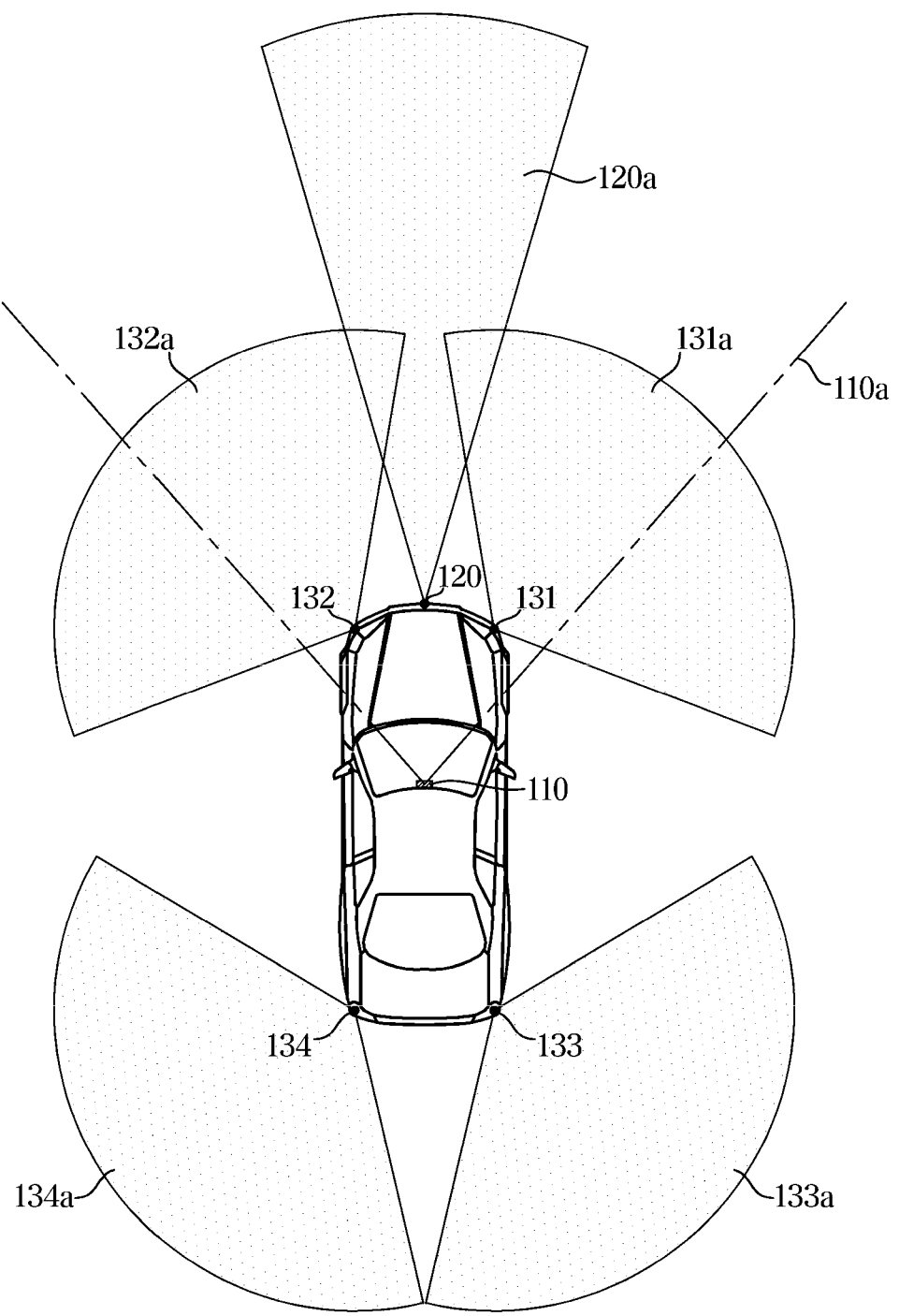
FIG. 3 is a diagram illustrating an example of a detection area of a camera and a radar included in an ADAS of a vehicle according to an embodiment.

FIG. 2 is a block diagram illustrating an ADAS provided in a vehicle according to an embodiment, and FIG. 3 is a diagram illustrating an example of a detection area of a camera and a radar included in an ADAS of a vehicle according to an embodiment.

The DAS according to the embodiment may perform a collision avoidance function for preventing a collision with an obstacle. That is, the ADAS according to the present embodiment may represent a collision avoidance apparatus.

Referring to FIG. 2, the vehicle 1 may include a braking system 32, a steering system 42, and a ADAS 100.

The braking system 32 according to the embodiment may include the EBCM (31 in FIG. 1) and the braking device (30 in FIG. 1) described in conjunction with FIG. 1, and the steering system 42 may include the EPS (41 in FIG. 1) and the steering device (40 in FIG. 1).

The ADAS 100 according to the embodiment may include a front camera 110 as a camera of the camera module 101, and may include a plurality of corner radars (130: 131, 132, 133, and 134) as the radar of the radar module 102.

Referring to FIG. 3, the ADAS 100 may include the front camera 110 configured to have a field of view 110a directed to the front of the vehicle 1, a front radar 120, and the plurality of corner radars 130.

The front camera 110 may be installed on a front windshield of the vehicle 1.

The front camera 110 may image the front of the vehicle 1 and acquire image data regarding the front of the vehicle 1. The image data regarding the front of the vehicle 1 may include position information of at least one of another vehicle, a pedestrian, a cyclist, a lane, a curb, a guard rail, a roadside tree, a street lamp, or the like existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix. In some embodiments, the image sensor may include CMOS, CCD, or other types of sensors, or any combination thereof.

The front camera 110 may be electrically connected to a first controller 140. For example, the front camera 110 may be connected to the first controller 140 through a vehicle communication network NT, through a hard wire, or through a printed circuit board (PCB).

The front camera 110 may transmit the image data of the front of the vehicle 1 to the first controller 140.

The front radar 120 may have a field of sensing 120a directed to the front of the vehicle 1. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle.

The front radar 120 may acquire front radar data from the transmission radio waves transmitted by the transmission antenna and the reflection radio waves received by the reception antenna.

Front radar data may include position information and velocity information regarding an obstacle, such as another vehicle, a pedestrian, or a cyclist existing in front of the vehicle 1.

The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the first controller 140 through a vehicle communication network NT, a hard wire, or a printed circuit board. The front radar 120 may transmit the front radar data to the first controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1. The first corner radar 131 may be installed on the right side of a front bumper of the vehicle 1.

The second corner radar 132 may have a field of sensing 132a directed to the front left side of the vehicle 1, and may be installed on the left side of the front bumper of the vehicle 1.

The third corner radar 133 may have a field of sensing 133a directed to the rear right side of the vehicle 1 and may be installed on the right side of a rear bumper of the vehicle 1.

The fourth corner radar 134 may have a field of sensing 134a directed to the rear left side of the vehicle 1 and may be installed on the left side of the rear bumper of the vehicle 1.

Each of the first, second, third and fourth corner radars 131, 132, 133, and 134 may include a transmission antenna and a reception antenna.

The first, second, third, and fourth corner radars 131, 132, 133 and 134 acquire first corner radar data, second corner radar data, third corner radar data, and fourth corner radar data, respectively.

The first corner radar data may include distance information and velocity information regarding another vehicle, a pedestrian or a cyclist (hereinafter, referred to as "an obstacle") existing on the front right side of the vehicle 1.

The second corner radar data may include distance information and velocity information regarding an obstacle existing on the front left side of the vehicle 1.

The third and fourth corner radar data may respectively include distance and velocity information regarding an obstacle existing on the rear right side of the vehicle 1 and distance and velocity information regarding an object located on the rear left side of the vehicle 1, respectively.

Each of the first, second, third, and fourth corner radars 131, 132, 133 and 134 may be connected to the first controller 140, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the first controller 140.

The first controller 140 may include the ECU (101*b* in FIG. 1) of the camera module (101 in FIG. 1) and/or the ECU (102*b* in FIG. 1) of the radar module (102 in FIG. 1), and/or an integrated ECU.

The first controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42.

For example, the processor 141 may include an image signal processor for processing the front image data of the front camera 110 and/or a digital signal processor for processing radar data of the radars 120 and 130 and/or a micro control unit (MCU) for generating a braking signal and/or a steering signal.

The processor 141 may detect obstacles (e.g., another vehicle, a pedestrian, a cyclist, a curb, a guard rail, a roadside tree, a street lamp, and the like) in front of the vehicle 1 based on the front image data of the front camera 110 and the front radar data of the radar 120.

In detail, the processor 141 may acquire position information (distance and direction) and velocity information (relative velocity) of the obstacles in front of the vehicle 1 based on the front radar data of the front radar 120. The processor 141 may acquire position information (direction) and type information (for example, whether the obstacle is another vehicle, a pedestrian, a cyclist, a curb, a guard rail, a roadside tree, a street lamp, or the like) of the obstacle existing in front of the vehicle 1 based on the front image data of the front camera 110.

In addition, the processor 141 may match the obstacles detected by the front image data with the obstacles detected by the front radar data, and acquire the type information, the position information, and the velocity information of the obstacles in front of the vehicle 1 based on a result of the matching.

The processor 141 may generate a braking signal and a steering signal based on the type information, the position information, and the velocity information of the front obstacles.

For example, the processor 141 calculates a time to collision (TTC) between the vehicle 1 and the front obstacle based on the position information (relative distance) and the velocity information (relative velocity) of the front objects, and warns the driver of a collision, transmits a braking signal to the braking system 32, or transmits a steering signal to the steering system 42 based on a result of comparing the TTC with a predetermined reference time.

In response to the TTC less than a predetermined first reference time, the processor 141 may allow an alert to be output via audio and/or display.

In response to the TTC less than a predetermined second reference time, the processor 141 may transmit a preliminary-braking signal to the braking system 32.

In response to the TTC less than a predetermined third reference time, the processor 141 may transmit an emergency braking signal to the braking system 32. In this case, the second reference time is shorter than the first reference time, and the third reference time is shorter than the second reference time.

The processor 141 may transmit a steering signal to the steering system 42 based on the direction information of the position information of the front obstacles.

As another example, the processor 141 may calculate a distance to collision (DTC) based on the velocity information (e.g., relative velocity) of front objects, and warn the driver of a collision or transmit a braking signal to the braking system 32 based on a result of comparing the DTC with distances to the front objects.

The processor 141 may acquire position information (distance and direction) and velocity information (relative velocity) of the obstacles on the sides of the vehicle 1 (front right, front left, rear right, and rear left) based on corner radar data of the plurality of corner radars 130.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

Figure 4:
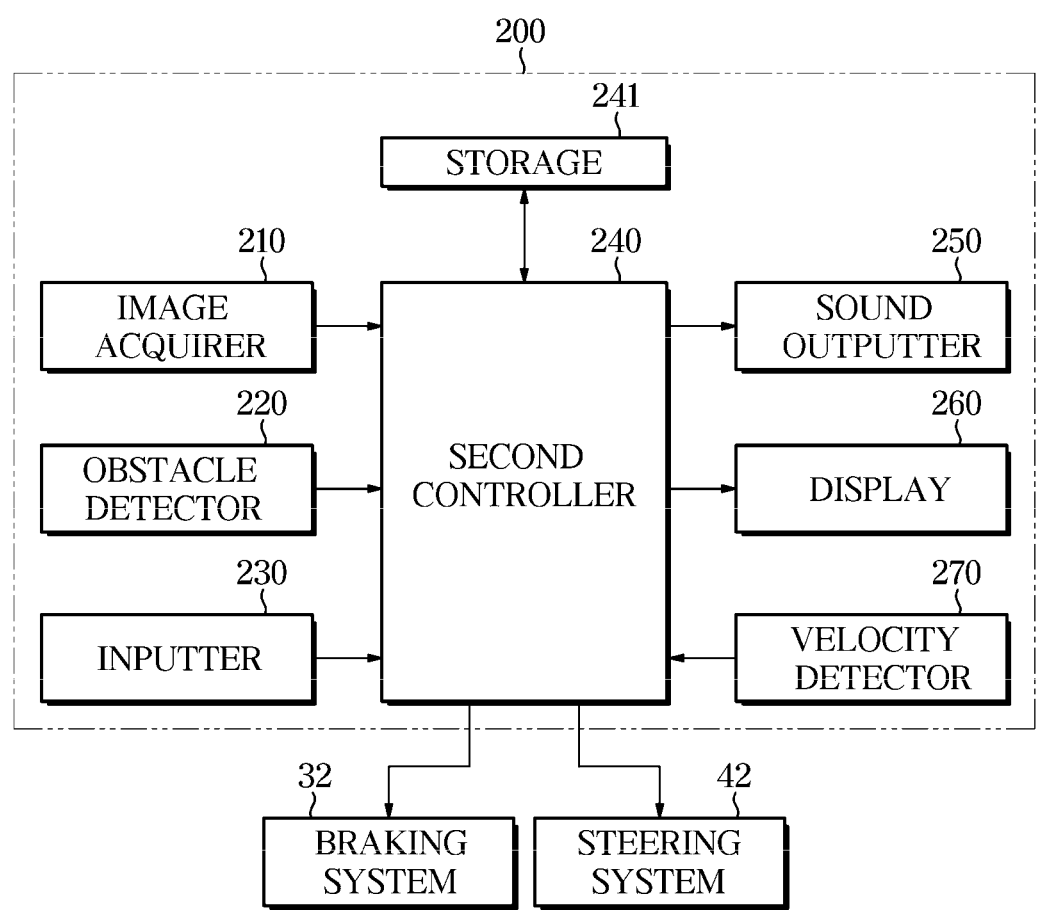
FIG. 4 is a block diagram illustrating an autonomous driving control apparatus of an ADAS provided in a vehicle according to an embodiment.

FIG. 4 is a block diagram illustrating the autonomous driving control apparatus 200 for performing autonomous travelling, of the ADAS 100 provided in a vehicle according to an embodiment.

The autonomous driving control apparatus 200 of the ADAS 100 may include an image acquirer 210, an obstacle detector 220, an inputter 230, a second controller 240, a storage 241, a sound outputter 250, and a display 260, and may further include the braking system 32 and the steering system 42.

The image acquirer 210 acquires an image of a road and transmits information about the acquired image to the second controller 240. The information about the image may be image data.

The image acquirer 210 may include the front camera 110, and may acquire image information of the road and acquire the shape of an obstacle from front image data photographed by the front camera 110.

The image information of the road may include an image of a lane line.

The shape of the obstacle may refer to information for recognizing the type of the obstacle. In addition, position information and velocity information of the obstacle may be also acquired from the image data obtained by the front camera.

The obstacle detector 220 detects obstacles on the front side and the left and right sides of a host vehicle, and transmits obstacle information about the detected obstacles to the second controller 240. The obstacle information may include position information of the obstacle, and the position information of the obstacle may include a distance to the obstacle and a direction of the obstacle.

The obstacle detector 220 may include the front radar 120 and the first and second corner radars 131 and 132.

In addition, the obstacle detector 220 may include a LiDAR sensor.

A light detection and ranging (LiDAR) sensor is a non-contact distance detection sensor using the laser radar principle.

The LiDAR sensor may include a transmitter for transmitting a laser and a receiver for receiving a laser, which is reflected from a surface of an object existing within a sensor range and then is returned.

The laser may be a single laser pulse.

For reference, since the LiDAR sensor has a higher accuracy in lateral direction detection when compared to a radar detecting and ranging (RaDAR) sensor, the use of the LiDAR sensor may increase the accuracy of determining whether a passage exists in the front area.

The obstacle detector 220 may include an ultrasonic sensor.

The ultrasonic sensor generates ultrasonic waves for a predetermined period of time and detects a signal, which is reflected by an object and then is returned. Such an ultrasonic sensor may be used to determine the presence or absence of an obstacle, such as a pedestrian, in a short range.

The inputter 230 receives an input regarding a manual travelling mode in which the driver directly drives the vehicle and an autonomous traveling mode in which the vehicle automatically travels, and transmits the input signal to the second controller 240.

The inputter 230 may be provided on a head unit or a center fascia in the vehicle, or may be provided on a terminal for a vehicle.

The inputter 230 may receive information about a destination in the autonomous driving mode, may receive a selection regarding a highway travelling, a national road traveling, and the like, and may also receive an input regarding a travelling velocity.

The inputter 230 may receive a selection regarding a control mode for preventing collision with an obstacle when the obstacle crosses at least one of two lane lines composing a subject lane.

Here, the control mode for preventing collision with the obstacle may include an in-lane deflection control mode and a lane change control mode In addition, the control mode for preventing collision with an obstacle may be automatically determined in response to the number of obstacles that cross the lane line and the presence of another obstacle.

The second controller 240 generates a route from the current position to a destination input by the user and controls the travelling with the generated route.

In the autonomous driving control, the second controller 240 may control the display 260 to display a road image or to display the position of the obstacle as a top view image.

The second controller 240 may control the vehicle to travel at a predetermined traveling velocity that is set for an autonomous driving mode in advance, or control the vehicle to travel at a traveling velocity input by the user.

The second controller 240 periodically acquires the traveling velocity of the host vehicle based on velocity information detected by the velocity detector 270, and controls acceleration and deceleration such that the acquired traveling velocity is kept at a predetermined traveling velocity.

When the velocity detector is provided using an acceleration sensor, the second controller 240 may acquire acceleration of the host vehicle based on information detected by the acceleration sensor, and acquire the traveling velocity of the host vehicle based on the acquired acceleration.

When the velocity detector is provided using an acceleration sensor and a plurality of wheel velocity sensors, the second controller 240 may acquire the acceleration of the host vehicle based on information detected by the acceleration sensor, and may acquire the travelling velocity of the host vehicle based on velocity information acquired by the plurality of wheel velocity sensors.

When the image information of the road is received during autonomous driving control, the second controller 240 recognizes a lane line of the road by performing image processing on the image information, and recognizes a subject lane on which the host vehicle travels based on position information of the recognized lane line, and controls the autonomous driving based on the positions of both lane lines of the subject lane.

The second controller 240 may virtually generate a tracking line for recognizing a moving route on the recognized subject lane, and control autonomous driving while following the generated tracking line.

The second controller 240 may set any one of the two lane lines as a reference lane line, and generate a tracking line at a position spaced by a predetermined distance from the reference lane.

In addition, the second controller 240 may acquire the width of the subject lane based on the positions of the two lane lines and generate a tracking line based on the acquired width of the subject lane such that the center of the vehicle follows the center point of the width of the subject lane. That is, the center point of the width of the subject lane may serve as a reference position of the tracking line.

That is, the second controller 240 may generate the tracking line that allows the center of the vehicle body to follow the center point of the subject lane for autonomous driving, and control the autonomous driving to be performed while following the generated tracking line.

The second controller 240 may recognize an obstacle based on obstacle information detected by the obstacle detector 220, and may warn the driver of a collision, transmit a braking signal to the braking system 32 or transmit a steering signal to the steering system 42 based on obstacle information of the recognized obstacle.

Here, the obstacle information may include information about the existence of the obstacle and the position information of the obstacle, and the position information of the obstacle may include a distance value and the direction of the obstacle.

The distance to the obstacle may be a relative distance between the host vehicle and the obstacle, and the direction of the obstacle may be a relative direction with respect to the host vehicle.

Upon receiving the position information of the obstacle, the second controller 240 acquires the velocity information of the obstacle based on a variation of the received position information of the obstacle.

That is, the second controller 240 may periodically receive position information of the obstacle detected by the obstacle detector, periodically acquire a distance value of the obstacle from the received position information of the obstacle, acquire a variation of the distance value over time from the periodically acquired distance values of the obstacle, and acquire velocity information corresponding to the moving velocity of the obstacle from the variation of the distance value.

The second controller 240 may acquire state information of the obstacle indicating whether the obstacle is in a stationary state or travelling state based on the acquired velocity information of the obstacle, and may determine whether the state information of the obstacle varies.

Here, the obstacle refers to an obstacle that exists at a position in front of the host vehicle with respect to the front bumper of the host vehicle, that is, obstacles existing in another lane on the left side of the subject lane and another lane on the right side of the subject lane. For example, the obstacle may be a pedestrian, a bicycle, a bike, another vehicle, a curb, a guardrail, a street lamp or a roadside tree.

The second controller 240 may recognize the obstacle based on the image of the road, and acquire state information of the obstacle whether the obstacle is in a stationary state or a traveling state based on a variation of the size and the position of the obstacle in the image.

In the recognizing of nearby obstacles, the second controller 240 may recognize obstacles existing on the front left side and the front right side of the host vehicle among obstacles on the road.

The second controller 240 may adjust the position of the generated tracking line based on the positions of the obstacles on the front left side and the front right side of the host vehicle, and control the autonomous driving of the vehicle based on the adjusted position of the tracking line.

Here, the adjusting of the position of the tracking line includes adjusting the direction of the tracking line.

The second controller 240 determines whether an obstacle exists in at least one of the front left side or the front right side of the vehicle based on the image of the road acquired by the image acquirer 210 and the detection information detected by the obstacle detector 220, and if it is determined that the obstacle exists, determines whether the obstacle crosses at least one of two lane lines constituting the subject lane.

Hereinafter, the two lane lines constituting the subject lane will be described as the subject lane lines.

That is, the second controller 240 identifies whether an obstacle travelling on another lane is positioned on at least one subject lane line.

In more detail, the second controller 240 may acquire the width of the subject lane which is the width between the two lane lines constituting the subject lane based on the image of the road.

The second controller 240 determines whether keeping of travelling on the subject lane is to be performed if the obstacle crosses at least one of the two subject lane lines, determines a possibility of collision with an obstacle if it is determined that the keeping of travelling on the subject lane is not to be performed, and controls the braking based on the possibility of collision with the obstacle.

The second controller 240 recognizes an obstacle based on the image of the road, and if the recognized obstacle is positioned on at least one of the two lane lines, acquires the extent to which the obstacle crosses the subject lane line, that is, the width of the obstacle overlapping the subject lane.

The second controller 240 may determine whether the keeping of travelling on the subject lane is to be performed based on the width of the vehicle body, the width of the subject lane, and the width of the obstacle overlapping the subject lane.

The second controller 240 determines that the keeping of travelling on the subject lane is to be performed if the acquired width of the obstacle overlapping the subject lane is less than or equal to a reference width, and determines that the keeping of travelling on the subject lane is not to be performed if the acquired width of the obstacle overlapping the subject lane is greater than the reference width.

In addition, the second controller 240 may determine the possibility of collision with an obstacle based on the width of the obstacle overlapping the subject lane.

If it is determined that the keeping of travelling on the subject lane is to be performed, the second controller 240 identifies the direction of the obstacle with respect to the host vehicle, and adjusts the moving route within the subject lane based on the identified direction of the obstacle, in which if the identified obstacle is in the first direction, the moving route is adjusted to be adjacent to the subject lane line existing in the second direction, and if the identified obstacle is in the second direction, the moving route is adjusted to be adjacent to the subject lane line existing in the first direction Here, the adjusting of the moving route includes adjusting the position of the tracking line for autonomous driving.

That is, the second controller 240 controls the vehicle to travel within the subject lane without crossing the subject lane lines if the width of the obstacle overlapping the subject lane is less than or equal to the reference width.

The first direction and the second direction may be the directions toward sides of the host vehicle. For example, the first direction may be a left side direction of the host vehicle, and the second direction may be a right side direction of the host vehicle.

The second controller 240 determines the possibility of collision with an obstacle if it is determined that the keeping of travelling on the subject lane is not to be performed, and performs lane departure control if it is determined that there is no possibility of collision with the obstacle. The lane departure control includes a lane deflection control or a lane change control.

In the lane deflection control, the second controller 240 identifies the direction of the obstacle with respect to the host vehicle, and performs deflection control toward the subject lane line existing in the second direction if the identified direction of the obstacle is the first direction, and performs deflection control toward the subject lane line existing in the first direction if the identified direction of the obstacle is the second direction.

Here, the lane deflection control refers to controlling the vehicle to travel while crossing one of the two subject lane lines.

In the lane deflection control, the second controller 240 may determine whether an obstacle exists on a lane in the first direction, and if it is determined that an obstacle exists on the lane in the first direction, control deceleration, and if the obstacle on the lane in the first direction is forward of the host vehicle with respect to the bumper of the host vehicle, perform deflection control toward the subject lane line in the first direction.

In the lane deflection control, the second controller 240 may determine whether an obstacle exists on the lane in the second direction, and if it is determined that the obstacle exists on the lane in the second direction, control deceleration, and if the obstacle on the lane in the second direction is forward of the host vehicle with respect to the bumper of the host vehicle, perform deflection control toward the subject lane line in the second direction.

In the lane change control, the second controller 240 identifies the direction of the obstacle with respect to the host vehicle, and if the identified direction of the obstacle is the first direction, performs lane change into another lane in the second direction, and if the identified direction of the obstacle is the second direction, performs lane change into another lane in the first direction, In the changing into the lane in the first direction, the second controller 240 may determine whether an obstacle exists on the lane in the first direction, and if it is determined that an obstacle exists on the lane in the first direction, control deceleration, and if the obstacle in the lane in the first direction is forward of the host vehicle with respect to the bumper of the host vehicle, perform lane change into the lane in the first direction.

In the changing into the lane in the second direction, the second controller 240 may determine whether an obstacle exists on the lane in the second direction, and if it is determined that an obstacle exists on the lane in the second direction, control deceleration, and if the obstacle in the lane in the second direction is forward of the host vehicle with respect to the bumper of the host vehicle, perform lane change into the lane in the second direction.

The second controller 240 determines the possibility of collision with an obstacle if it is determined that the keeping of travelling on the subject lane is not to be performed, and performs braking control if it is determined that there is a possibility of collision with the obstacle. The second controller 240 controls the vehicle to decelerate.

Based the acquired relative information of the obstacle having a width of the obstacle overlapping the subject lane that is less than or equal to the reference width, the second controller 240 determines whether the state of the obstacle is changed from a stationary state to a travel state, and reacquires the width of the obstacle overlapping the subject lane if it is determined that the state of the obstacle is changed from a stationary state to a travel state, and determines that there is a possibility of collision with the obstacle if it is determined that the reacquired width of the obstacle overlapping the subject lane is greater than the reference width.

In addition, the second controller 240 may determine that there is a possibility of collision with the obstacle if it is determined that the obstacle crossing the subject lane line in a stationary state has a width of the obstacle overlapping the subject lane that is greater than the reference width.

The second controller 240 determines that there is no possibility of collision with the obstacle if it is determined that the obstacle is in a travelling state in a state in which the acquired width of the obstacle overlapping the subject lane is greater than the reference width.

The second controller 240 performs lane deflection control or lane change control if it is determined that there is no possibility of collision with the obstacle in a state in which the acquired width of the obstacle overlapping the subject lane is greater than the reference width.

The second controller 240 controls deceleration if it is determined that there is a possibility of collision with the obstacle.

The second controller 240 determines the possibility of collision with an obstacle if the obstacle crosses at least one of the two lane lines.

In the determining of the possibility of collision with the obstacle, the second controller 240 may calculate a TTC between the host vehicle 1 and the obstacle based on position information (relative distance) and velocity information (relative velocity) of the obstacles, and determine the possibility of collision with the obstacle based on a result of comparing the TTC with a predetermined reference time.

That is, the second controller 240 determines that there is a possibility of collision if the TTC is less than or equal to the predetermined reference time.

In the determining of the possibility of collision with the obstacle, the second controller 240 may calculate a DTC based on velocity information (relative velocity) of the obstacles, and determine the possibility of collision with the obstacle based on a result of comparing the DTC with distances to the obstacles.

That is, the second controller 240 determines that there is a possibility of collision if the DTC is less than or equal to the distances to the obstacles.

If it is determined that there is a possibility of collision with an obstacle in a travelling state that crosses the subject lane line, the second controller 240 may identify the travelling velocity of the obstacle, and if the travelling velocity of the obstacle is lower than the travelling velocity of the host vehicle, perform lane deflection control or lane change control.

If it is determined that there is a possibility of collision with an obstacle in a travelling state that crosses the subject lane line, the second controller 240 may identify the relative velocity of the obstacle, and if the relative velocity of the obstacle is lower than a reference velocity, the second controller 240 may perform lane deflection control or lane change control.

The second controller 240 may identify the position of an obstacle having a possibility of collision, and if it is determined that the obstacle having a possibility of collision is positioned in front of the host vehicle, the second controller 240 may control acceleration such that the traveling velocity reaches a predetermined velocity.

In the lane deflection control, the second controller 240 may identify the position of the obstacle and if the identified position of the obstacle is in front of the host vehicle, control steering such that the host vehicle returns to the subject lane.

That is, when following the adjusted tracking line, the second controller 240 determines whether to readjust the tracking line based on the position information of the obstacle during autonomous driving control, and controls the steering based on whether the tracking line is readjusted.

In this case, the steering control includes changing the travelling direction of the vehicle based on a received control signal.

In addition, the second controller 240 may drive the steering device by a steering angle corresponding to the position information of the tracking line, or may drive the steering device until the position of the tracking line to be adjusted is reached based on the detection information of the steering angle detector.

The second controller 240 returns the steering device to its original position when the position adjustment of the tracking line for autonomous driving is completed.

The second controller 240 of the autonomous driving control apparatus may communicate with the braking system 32 and the steering system 42.

The braking system 32 may perform braking in response to a braking signal of the second controller 240 to prevent a collision with an obstacle.

The braking system 32 may also perform emergency braking based on a braking signal of the second controller 240.

The steering system 42 may perform steering to adjust the moving route in response to a steering signal of the second controller 240.

The storage 241 may store a reference width for determining the margin of the vehicle width.

The storage 241 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the storage 241 is not limited thereto.

The storage unit 241 may be a memory implemented as a chip separated from the processor, which will be described below in connection with the second controller 240, or may be implemented as a single chip integrated with the processor.

The sound outputter 250 outputs sound in response to a control command of the second controller 240.

The sound outputter 250 may output a warning sound for notifying the presence of an obstacle that crosses at least one of the two lane lines of the subject lane.

The sound outputter 250 may output an avoidance traveling notification sound for avoiding the obstacle that crosses the lane line.

The sound outputter 250 may output a warning sound for preventing collision with an obstacle. The sound outputter 250 may be a speaker.

The display 260 may display an image or turn on or turn off a light in response to a control command of the second controller 240.

The display 260 may display an image of a road, or display road guidance information and map information.

The display 260 may display a top view image of the vehicle.

The display 260 may display notification information of an obstacle that crosses at least one of the two lane lines of the subject lane.

The display 260 may also display avoidance travelling information for avoiding an obstacle that crosses the lane line.

The display 260 may display a travelling mode of the vehicle and display failure information and the like.

That is, the display 260 may display an autonomous driving mode or a manual driving mode.

The display 260 may be a lamp, such as an LED lamp, or a flat panel display, such as an LCD.

The display unit 260 may be a display panel to be provided in a terminal for a vehicle.

The display 260 may display an obstacle acquired by the image acquirer 210 in addition to the lane line.

The velocity detector 270 detects a traveling velocity of the vehicle.

The velocity detector 270 may include a plurality of wheel velocity sensors provided on a plurality of wheels, respectively, to detect wheel velocities of the plurality of wheels.

The velocity detector 270 may also include an acceleration sensor for detecting an acceleration of the vehicle.

The velocity detector 270 may include the plurality of wheel velocity sensors together with the acceleration sensor.

Figure 5:
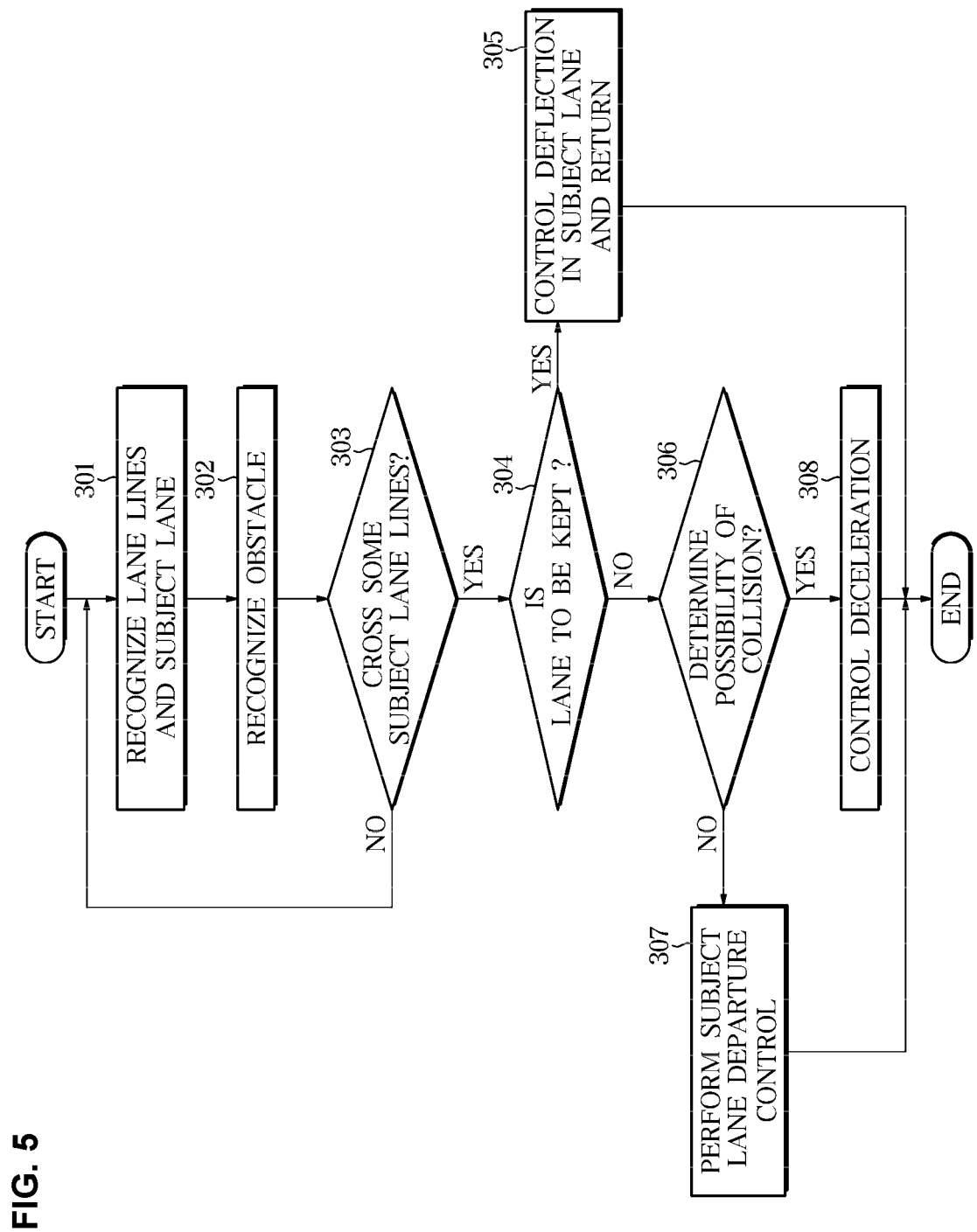
FIG. 5 is a control flowchart showing a method of controlling a vehicle according to an embodiment.

FIG. 5 is a control flowchart showing a method of controlling a lane keeping apparatus provided in a vehicle according to an embodiment, which will be described with reference to FIGS. 6 to 8, and FIG. 9A and FIG. 9B.

If the travelling mode is the autonomous driving mode, the vehicle generates a route from the current position to a destination input by the user and controls the traveling with the generated route.

The vehicle acquires an image of the road by activating the image acquirer 210 during autonomous driving, processes the acquired image of the road to recognize lane lines of the road in the image, and based on the positions of the recognized lane lines, recognizes a subject lane (301), and performs autonomous driving while following the recognized subject lane.

In this case, the vehicle acquires the traveling velocity of the host vehicle, compares the acquired traveling velocity with a predetermined traveling velocity, and performs the autonomous driving while controlling braking and acceleration such that the acquired traveling velocity reaches the predetermined traveling velocity.

The predetermined travelling velocity may be a velocity set by a user.

The acquiring of the traveling velocity of the host vehicle may include acquiring the traveling velocity of the host vehicle based on a plurality of pieces of wheel velocity information acquired by the plurality of wheel velocity sensors.

The acquiring of the traveling velocity of the host vehicle may include acquiring the acceleration of the host vehicle based on information detected by the acceleration sensor, and acquiring the traveling velocity of the host vehicle based on the acquired acceleration.

The acquiring of the traveling velocity of the host vehicle may include acquiring acceleration information of the host vehicle based on information detected by the acceleration sensor, and based on the acquired acceleration information and the velocity information acquired by the plurality of wheel velocity sensors, acquiring the travelling velocity of the host vehicle.

In addition, the vehicle may recognize the width of the subject lane based on the positions of the two lane lines forming the subject lane.

In addition, the vehicle may recognize an obstacle in the image through the image processing, and may acquire position information of the recognized obstacle based on the image.

Here, the obstacle refers to an obstacle that exists in another lane at a position in front of the host vehicle with respect to the front bumper of the host vehicle. For example, the obstacle may be at least one of a pedestrian, a bicycle, a bike, another vehicle, a curb, a guardrail, a street lamp, or a roadside tree.

The vehicle controls the autonomous driving while recognizing the subject lane on which the host vehicle is travelling and the obstacles.

The vehicle recognizes an obstacle around the vehicle based on the image of the road and the obstacle information of the obstacle detector 220 (302).

In this case, the vehicle may acquire position information of the detected obstacle based on the detection information detected by the obstacle detector 220, and may determine whether the obstacle exists on the front left side or front right side of the host vehicle based on the acquired position information of the obstacle.

The determining of whether an obstacle exists on the front left side of the host vehicle includes determining whether an obstacle exists in another lane on the left side of the subject lane.

The determining of whether an obstacle exists on the front right side of the host vehicle includes determining whether an obstacle exists in another lane on the right side of the subject lane.

The vehicle may determine whether the obstacle existing on the left or right side of the host vehicle crosses at least one of the two subject lane lines based on the image of the road (303).

If it is determined that the obstacle crosses at least one of the two subject lane lines, the vehicle acquires position information (distance and direction) and velocity information (relative velocity) of obstacles in front of the vehicle 1 based on front radar data of the front radar 120 of the obstacle detector 220, and determines whether the recognized obstacle is in a stationary state or in a travelling state based on the acquired position information (distance and direction) and velocity information (relative velocity) of the obstacles.

The vehicle may determine whether the recognized obstacle is in a stationary state or in a travelling state based on a variation of the obstacle image in the image of the road.

The vehicle may acquire position information (direction) and type information (for example, whether the obstacle is another vehicle, a pedestrian, a cyclist, a cub, a guard rail, a roadside tree, a street lamp, or the like) of the obstacles existing in front of the vehicle 1 based on the front image data of the front camera 110. In this case, the vehicle may determine whether the recognized obstacle is an obstacle in a fixed state, and may determine whether the obstacle in a fixed state crosses the subject lane line.

In addition, the vehicle may acquire position information (distance and direction) and velocity information (relative velocity) of the obstacles on the sides of the vehicle 1 (front right, front left, rear right, and rear left) based on corner radar data of the plurality of corner radars 130.

The vehicle may acquire the position information (distance and direction) and the velocity information (relative velocity) of the obstacles around the vehicle 1 based on at least one of the front image data of the front camera 110, the corner radar data of the plurality of corner radars 130, and the front radar data of the front radar 120.

The vehicle determines whether keeping of travelling on the subject lane is to be performed if it is determined that an obstacle crosses the subject lane line (304).

In more detail, the vehicle recognizes an obstacle based on the image of the road, and if the recognized obstacle is positioned on at least one of the two subject lane lines, acquires the extent to which the obstacle crosses the subject lane line, that is, the width of the obstacle overlapping the subject lane.

The vehicle determines that the keeping of travelling on the subject lane is to be performed if the acquired width of the obstacle overlapping the subject lane is less than or equal to a reference width, and performs a deflection control within the subject lane.

In addition, the vehicle may determine whether the keeping of travelling on the subject lane is to be performed based on the width of the vehicle body, the width of the subject lane, and the width of the obstacle overlapping the subject lane.

For example, the vehicle may determine that the keeping of travelling on the subject lane is to be performed if a value of the width of the subject lane minus the width of the obstacle overlapping the subject lane is greater than or equal to the width of the vehicle body.

On the contrary, the vehicle may determine that the keeping of travelling on the subject lane is not to be performed if a value of the width of the subject lane minus the width of the obstacle overlapping the subject lane is less than the width of the vehicle body.

In the deflection control within the subject lane, the vehicle identifies the direction of the obstacle with respect to the host vehicle, and adjusts the moving route within the subject lane based on the identified direction of the obstacle, in which if the identified obstacle is in the first direction, the moving route is adjusted to be adjacent to the subject lane line existing in the second direction, and if the identified obstacle is in the second direction, the moving route is adjusted to be adjacent to the subject lane line existing in the first direction.

For example, when the vehicle is travelling on the second lane, if it is determined that another vehicle on the first lane crosses the left lane line of the second lane, the travelling of the vehicle is kept on the second lane at a position adjacent to the right lane line of the second lane. When the vehicle is travelling on the second lane, if it is determined that another vehicle on the third lane crosses the right lane line of the second lane, the travelling of the vehicle is kept on the second lane at a position adjacent to the left lane line of the second lane. In this case, the vehicle performs travelling within the subject lane without crossing the subject lane lines.

Figure 6:
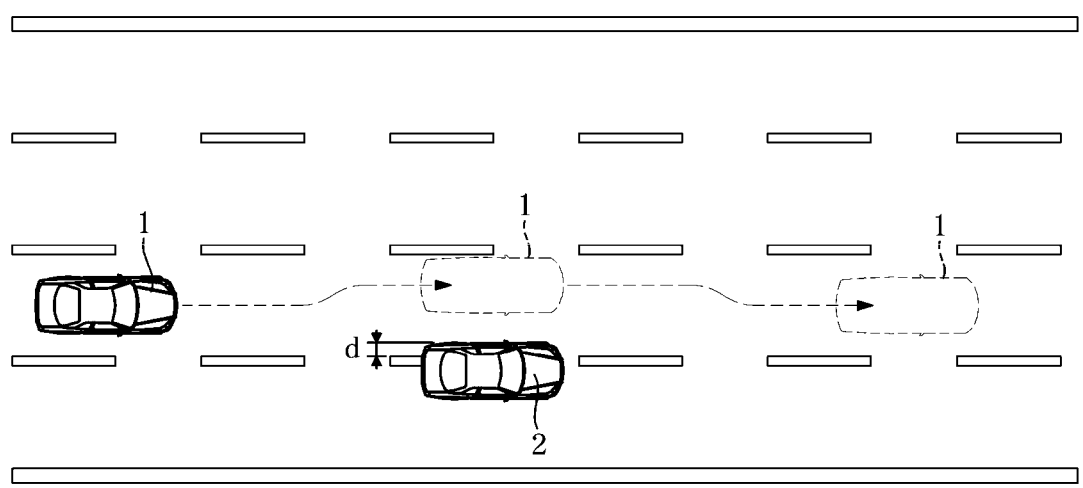
FIGS. 6, 7, 8, 9A and 9B are diagrams illustrating an example in which a moving route of a vehicle is adjusted according to an embodiment.

Referring to FIG. 6, when the vehicle is travelling on the third lane, if it is determined that another vehicle in a stationary state on the fourth lane crosses the right lane line of the third lane, the width (d) to which the other vehicle on the fourth lane crosses the right lane line of the third lane is identified, and if the identified width (d) is less than or equal to a reference width, the travelling of the vehicle is kept on the third lane at a position adjacent to the left lane line of the third lane. In this case, the vehicle performs travelling within the third lane without crossing the subject lane lines.

Thereafter, the vehicle identifies the position of the obstacle, and if the position of the obstacle is behind the host vehicle, controls a return (305).

That is, the vehicle determines whether the other vehicle on the fourth lane is positioned behind the host vehicle during the deflection control in the subject lane, and it is determined that the other vehicle on the fourth lane is positioned behind the host vehicle, moves to the center of the subject lane, and performs autonomous driving by following the center of the subject lane.

The vehicle determines that the keeping of travelling on the subject lane is not to be performed if the determined width of the obstacle overlapping the subject lane, determines whether there is a possibility of collision with another obstacle due to lane departure upon determining that the keeping of travelling on the subject lane is not to be performed (306), and performs subject lane departure control (307) or deceleration control (308) depending on the possibility of collision with the other obstacle.

The other obstacle is an obstacle different from the obstacle that crosses the subject lane line, and may refer to an obstacle existing on a lane adjacent to a lane line at a side opposite to the obstacle that crosses the one lane line.

For example, when the host vehicle is travelling on the second lane, and an obstacle crossing the right side lane line of the second lane exists on the third lane, another obstacle may refer to an obstacle existing on the first lane.

In the lane deflection control or lane change control upon determining that the keeping of travelling on the subject lane is not to be performed, the vehicle determines the possibility of collision with the other obstacle, and if it is determined that there is no possibility of collision, performs the lane deflection or the lane change control, and if it is determined that there is a possibility of collision, performs deceleration control.

Here, the lane deflection control refers to controlling a travel to be performed in a state of crossing one of the two subject lane lines.

In addition, in a state in which a value of the width of the lane minus the width of the obstacle overlapping the subject lane is greater than the width of the vehicle body, if the state of the recognized obstacle is changed from a stationary state to a travelling state, whether the keeping of travelling on the subject lane is to be performed may be redetermined.

That is, the vehicle may identify a variation of the width of the obstacle overlapping the subject lane if the state of the obstacle crossing the subject lane line is changed from a stationary state to a travelling state, determine that the keeping of travelling on the subject lane is not to be performed if the width of the obstacle overlapping the subject lane increases, and perform the subject lane departure control.

The subject lane departure control may include a lane deflection control and a lane change control.

The vehicle may control braking in the deceleration control, identify the position of the obstacle, and if the position of the obstacle is behind the host vehicle, control acceleration such that the travelling velocity reaches a predetermined velocity.

Hereinafter, the lane departure control and the deceleration control are described with reference to FIGS. 7, 8, 9A, and 9B.

Figure 7:
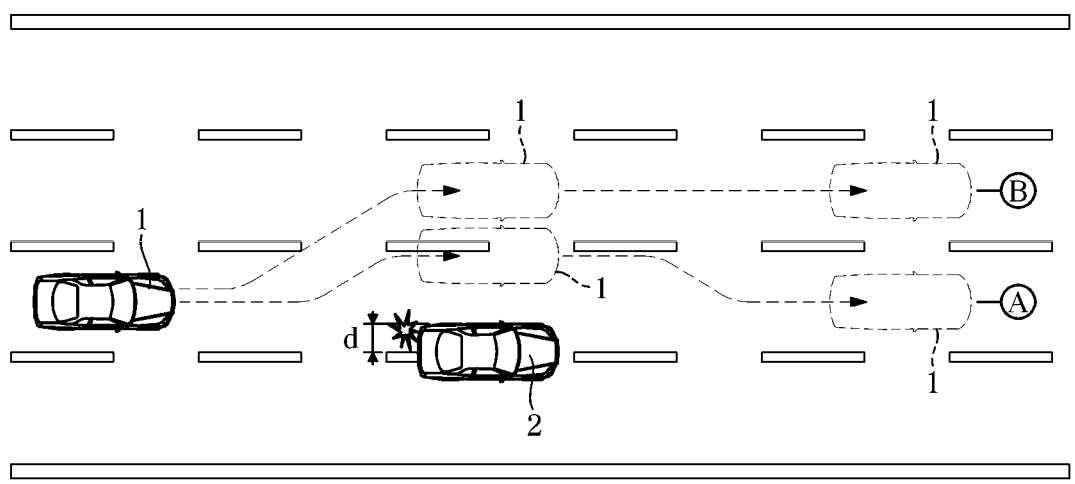

Referring to FIG. 7, in the lane deflection control (A), the vehicle identifies the direction of the obstacle with respect to the host vehicle, and performs deflection control toward the subject lane line existing in the second direction if the identified direction of the obstacle is the first direction, and performs deflection control toward the subject lane line existing in the first direction if the identified direction of the obstacle is the second direction.

Thereafter, the vehicle identifies the position of the obstacle that crosses the subject lane line, and if the identified position of the obstacle is behind the host vehicle, moves to the center of the subject lane.

Here, the moving of the center of the subject lane may include controlling steering.

Referring to FIG. 7, in the lane change control (B), the vehicle identifies the direction of the obstacle with respect to the host vehicle, and if the identified direction of the obstacle is the first direction, performs lane change into another lane in the second direction, and if the identified direction of the obstacle is the second direction, performs lane change into another lane in the first direction, Thereafter, the vehicle may continue travelling on the changed lane or may perform return control into the previous lane based on navigation information.

In addition, in the lane departure control, the vehicle may determine whether an obstacle exists in a steering direction based on radar data of the corner radar, and if it is determined that an obstacle exists in the steering direction, stop steering control.

In the lane departure control, the vehicle may determine whether the obstacle in the steering direction is an obstacle corresponding to a fixed object based on a variation of the radar data of the corner radar.

Figure 8:
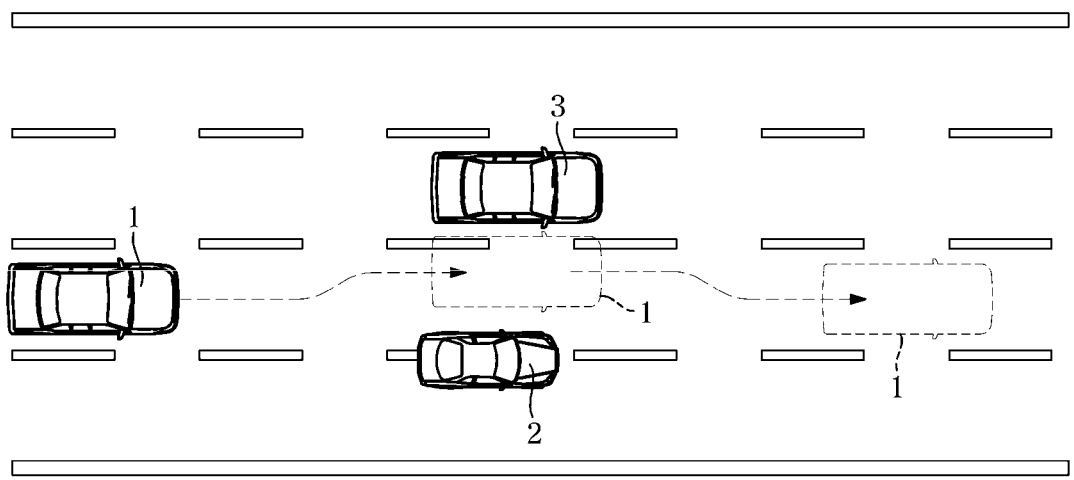

Referring to FIG. 8, if it is determined that the keeping on the lane is not to be performed, the vehicle may determine whether another obstacle 3 exists before performing the lane departure control, and if it is determined that the other obstacle 3 exists, determine the possibility of collision with the other obstacle 3, and if it is determined there is no possibility of collision with the other obstacle 3, perform the lane deflection control.

Figure 9A:
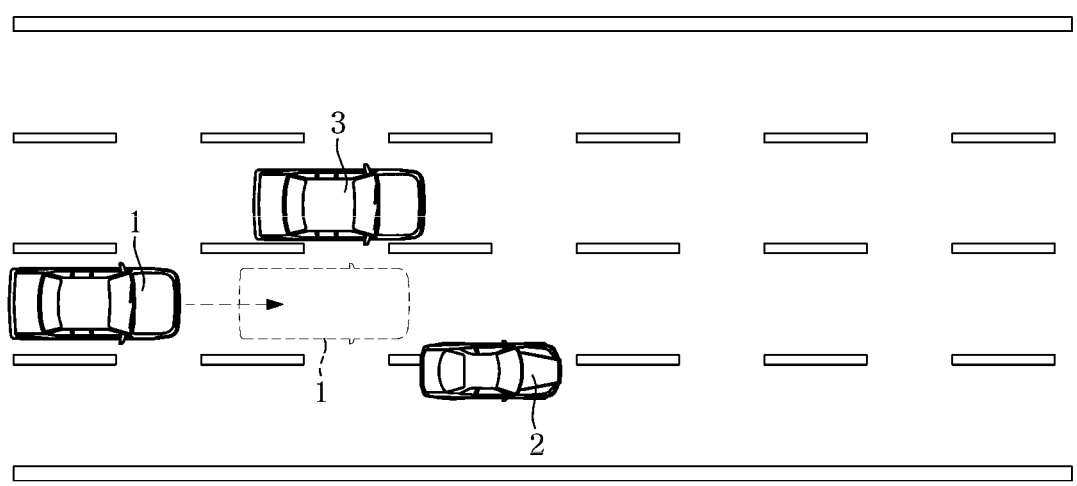

Referring to FIG. 9A, if it is determined that the keeping on the lane is not to be performed, the vehicle may determine whether another obstacle 3 exists before performing the lane departure control, and if it is determined that the other obstacle 3 exists, determine the possibility of collision with the other obstacle 3, and if it is determined there is a possibility of collision with the other obstacle 3, controls deceleration while travelling along the center line of the subject lane.

Figure 9B:
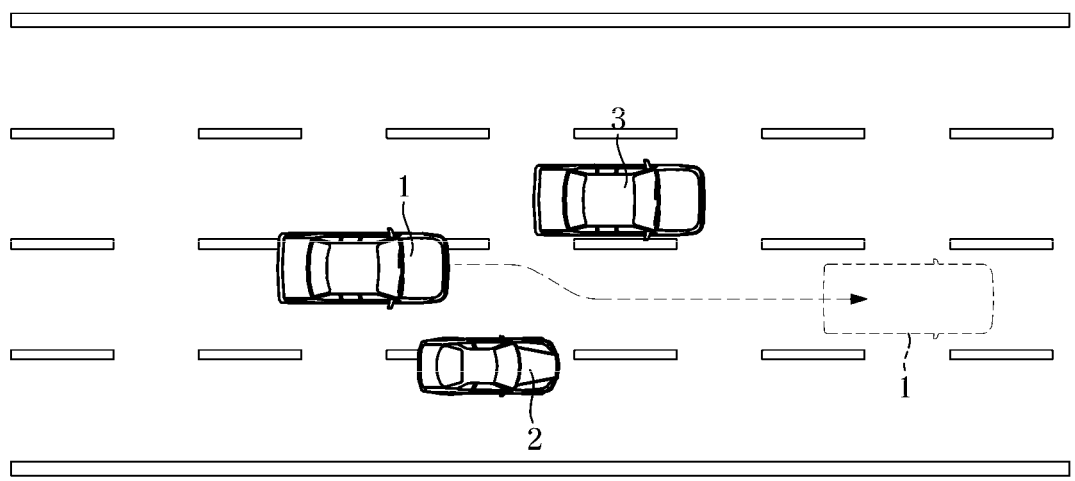

Referring to FIG. 9B, the vehicle identifies the position of the other obstacle 3, and if it is determined that the identified position of the other obstacle 3 is in front of the host vehicle, performs a lane deflection control or a lane change control, and then controls acceleration and identifies the position of an obstacle 2 crossing the lane line, and if the identified position of the obstacle 2 is behind the host vehicle, performs a return to the center of the subject lane.

The performing of a return to the center of the subject lane includes controlling the steering.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the above, according to the present disclosure, an autonomous moving route adjustment or a braking control is performed on behalf of a driver before a collision with an obstacle occurs, so that a collision with an obstacle can be prevented, the incidence of additional injuries can be reduced, and driving stability can be improved.

According to the present disclosure, in the autonomous driving mode, based on movement of a vehicle on a next lane and the width of the next lane, a moving route is adjusted toward another next lane, such that the distance to another vehicle on the next lane is increased, thereby preventing a collision with the other vehicle on the next lane. Accordingly, the stability of the vehicle can be improved and the tension of the driver can be lowered.

According to the present disclosure, in the autonomous driving mode, acceleration and braking are performed depending on the road condition and steering control is performed to adjust a moving route, thus corresponding to an autonomous driving level 3 (Level3) or higher.

As such, the present disclosure can flexibly cope with various situations on the road.

As described above, the present disclosure can improve the quality and the merchandise of the vehicle having the autonomous driving control device and the autonomous driving function and further increase the user's satisfaction and secure the competitiveness of the product.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. An advanced driver assistance system comprising:
    an image acquisition device configured to acquire an image of a road in front of a vehicle; and
    a controller including a processor configured to process the image of the road acquired by the image acquisition device, wherein the controller is configured to recognize a lane line, a subject lane, and an obstacle, and determine a width of the obstacle overlapping the subject lane, based on the acquired image of the road,
if an obstacle is found to exist on at least one of two subject lane lines constituting the subject lane, output a braking control signal or a route adjusting signal, and
determine whether to cause the vehicle to keep travelling on the subject lane based on a relative value of the determined width of the obstacle overlapping the subject lane relative to a reference width.

2. The advanced driver assistance system of claim 1, wherein the controller is further configured to determine a width of the obstacle overlapping the subject lane based on the acquired image of the road, and
cause, if the determined width of the obstacle overlapping the subject lane is less than or equal to a reference width, the vehicle to keep travelling on the subject lane and
cause, if the determined width of the obstacle overlapping the subject lane is greater than the reference width, a departure of the vehicle from the subject lane.

3. The advanced driver assistance system of claim 2, wherein the controller is configured to cause the vehicle to keep travelling on the subject lane by allowing the vehicle to travel on the subject lane by identifying a direction in which the obstacle in the stationary state crosses the subject lane and performing a deflection control in a direction opposite to the identified direction with respect to the subject lane.

4. The advanced driver assistance system of claim 2, wherein the controller is configured to cause the departure of the vehicle from the subject lane by identifying position information of another obstacle, determining a possibility of collision with the other obstacle based on the identified position information of the other obstacle, and if it is determined that there is no possibility of collision with the other obstacle, causing the vehicle to travel by crossing the subject lane line.

5. The advanced driver assistance system of claim 2, wherein the controller is configured to cause the departure of the vehicle from the subject lane by identifying position information of another obstacle, determining a possibility of collision with the other obstacle based on the identified position information of the other obstacle, and if it is determined that there is a possibility of collision with the other obstacle, causing the vehicle to change lanes.

6. The advanced driver assistance system of claim 2, wherein the controller is configured to identify a state of the obstacle that crosses the subject lane line, and if a state of the obstacle is changed from a stationary state to a travelling state, identify a variation of the width of the obstacle overlapping the subject lane, and if the identified width of the obstacle overlapping the subject lane increases, cause the vehicle to change lane.

7. The advanced driver assistance system of claim 1, wherein the controller is configured to
determine a width of the obstacle overlapping the subject lane based on the acquired image of the road,
determine whether to cause the vehicle to keep travelling on the subject lane based on the determined width of the obstacle overlapping the subject lane, and cause departure of the vehicle from the lane if the vehicle is not to be caused to keep travelling on the subject lane, and
in the causing of the departure of the vehicle from the lane, determine a possibility of collision with another obstacle based on position information of the other obstacle, and cause deceleration if it is determined that there is a possibility of collision with the other obstacle.

8. The advanced driver assistance system of claim 1, further comprising an obstacle detector configured to detect an obstacle,
wherein the controller is configured to acquire position information of an obstacle based on obstacle information detected by the obstacle detector, and determine whether the obstacle is in a stationary state based on the acquired position information of the obstacle.

9. A vehicle comprising:
an image acquisition device configured to acquire an image of a road in front of a vehicle;
a non-image sensor including a LiDAR sensor and a radar sensor;
a controller including a processor configured to process the image of the road acquired by the image acquisition device and data sensed by the non-image sensor;
a steering system configured to perform steering in response to a command of the controller; and
a braking system configured to perform braking in response to a command of the controller,
wherein the controller is configured to:
recognize a lane line, a subject lane, and an obstacle, and determine a width of the obstacle overlapping the subject lane, based on the acquired image of the road,
determine whether the recognized obstacle exists on at least one of two subject lane lines constituting the subject lane, and
output a braking control signal or a route adjusting signal to the braking system or the steering system depending on a value of the determined width of the obstacle overlapping the subject lane relative to a reference width.

10. The vehicle of claim 9, wherein the controller is configured to determine whether to cause the vehicle to keep travelling on the subject lane is to be performed based on the acquired width of the obstacle overlapping the subject lane, and if the vehicle is not to be caused to keep travelling in the subject lane, output a deflection control signal to avoid the obstacle in the stationary state.

11. The vehicle of claim 10, wherein the controller is configured to output the deflection control signal by identifying a direction of the obstacle in the stationary state and cause a deflection in a direction opposite to the identified direction with respect to the subject lane.

12. The vehicle of claim 10, wherein the controller is configured to cause the departure of the vehicle from the subject lane to avoid the obstacle in the stationary state if it is determined that the vehicle is not to be caused to keep travelling on the subject lane.

13. The vehicle of claim 12, wherein the controller is configured to cause the departure of the vehicle from the subject lane by determining a possibility of collision with another obstacle, and if it is determined that there is no possibility of collision with the other obstacle, causing the vehicle to travel by crossing the subject lane line.

14. The vehicle of claim 12, wherein of the controller is configured to cause the departure of the vehicle from the subject lane by determining a possibility of collision with another obstacle, and if it is determined that there is no possibility of collision with the other obstacle, causing the vehicle to change lanes.

15. The vehicle of claim 12, wherein the controller is configured to identify a variation of the determined width of the obstacle overlapping the subject lane if a state of the obstacle crossing the subject lane line is changed from a stationary state to a travel state, and cause the vehicle to change lane if the identified width of the obstacle overlapping the subject lane increases.

16. A method of controlling a vehicle, the method comprising:

acquiring an image of a road in front of a vehicle in an autonomous driving mode;

recognizing a lane line, a subject lane, and an obstacle based on the acquired image of the road;

determining, if the obstacle exists on at least one of two subject lane lines constituting the subject lane, a width of the obstacle overlapping the subject lane;

determining whether to cause the vehicle to keep travelling on the subject lane based on the determined width of the obstacle overlapping the subject lane;

causing, if the vehicle is to be caused to keep travelling on the subject lane, a deflection of the vehicle within the subject lane to avoid the obstacle; and causing, if the vehicle is not to be caused to keep travelling on the subject lane, departure of the vehicle from the subject lane or deceleration of the vehicle.

17. The method of claim 16, wherein the causing a deflection of the vehicle within the subject lane includes identifying a direction of the obstacle in the stationary state and causing a deflection in a direction opposite to the identified direction with respect to the subject lane.

18. The method of claim 16, wherein the causing the departure from the subject lane includes:

determining a possibility of collision with another obstacle; and causing, if it is determined that there is no possibility of collision with the other obstacle, the vehicle to travel by crossing the subject lane line.

19. The method of claim 16, wherein the causing the departure from the subject lane includes:

determining a possibility of collision with another obstacle in the controlling of the departure from the subject lane; and causing, if it is determined that there is no possibility of collision with the other obstacle, the vehicle to change lanes.

20. The method of claim 16, further comprising, identifying, if a state of the obstacle crossing the subject lane line is changed from a stationary state to a travel state, a variation of the determined width of the obstacle overlapping the subject lane, and causing, if the width of the obstacle overlapping the subject lane increases, lane change.

* * * * *